United States Patent [19]

Maruoka et al.

[11] Patent Number: 5,229,195
[45] Date of Patent: Jul. 20, 1993

[54] COMPOSITE BODY HAVING A BLISTER-FREE PRESSURE-SENSITIVE ADHESIVE SHEET ATTACHED THERETO

[75] Inventors: Shigenobu Maruoka, Kawasaki; Ichiro Tsuchida, Koshigaya; Takanori Saito, Ohmiya, all of Japan

[73] Assignee: Lintec Corporation, Tokyo, Japan

[21] Appl. No.: 899,048

[22] Filed: Jun. 16, 1992

Related U.S. Application Data

[60] Continuation of Ser. No. 605,010, Oct. 22, 1990, abandoned, which is a division of Ser. No. 232,496, Aug. 15, 1988, abandoned.

[30] Foreign Application Priority Data

| Aug. 26, 1987 | [JP] | Japan | 62-213745 |
| Feb. 27, 1988 | [JP] | Japan | 62-45579 |
| Jun. 2, 1988 | [JP] | Japan | 63-135989 |

[51] Int. Cl.$^5$ ............................................. C09J 7/02
[52] U.S. Cl. ................................... 428/220; 428/355; 428/412; 428/520; 428/522; 525/301
[58] Field of Search ............. 428/343, 355, 522, 523, 428/515, 412, 520, 220; 525/301

[56] References Cited

U.S. PATENT DOCUMENTS

| 3,786,116 | 1/1974 | Milkovich | 525/301 |
| 3,879,494 | 4/1975 | Milkovich | 525/301 |
| 3,928,255 | 12/1975 | Milkovich | 525/301 |
| 4,551,388 | 11/1985 | Schlademan | 428/355 |
| 4,554,324 | 11/1985 | Husman et al. | 525/301 |
| 4,902,569 | 2/1990 | Chen | 525/301 |

*Primary Examiner*—Jenna L. Davis
*Attorney, Agent, or Firm*—Frishauf, Holtz, Goodman & Woodward

[57] ABSTRACT

The pressure-sensitive adhesive sheet of the invention is free from the troubles of forming blisters due to the gas emission from the substrate surface to which the adhesive sheet is applied and bonded by using a unique pressure-sensitive adhesive to form the adhesive layer on a base sheet. The principal ingredient of the pressure-sensitive adhesive used in the present invention is a copolymer having a specified molecular weight and a specified glass transition temperature and composed of (a) from 50 to 85% by weight of a first monomeric moiety of an acrylic ester, e.g., 2-ethylhexyl acrylate, (b) from 1 to 30% by weight of a second monomeric moiety of an acrylic compound having a polar group, e.g., acrylic acid, and (c) from 5 to 40% by weight of a third monomeric moiety of a macromonomer having a polymeric molecular chain of styrene units and/or methyl methacrylate units and having a polymerizable functional group, e.g., methacryloyl group, at the molecular chain end.

21 Claims, No Drawings

COMPOSITE BODY HAVING A BLISTER-FREE PRESSURE-SENSITIVE ADHESIVE SHEET ATTACHED THERETO

This application is a continuation of application Ser. No. 07/605,010, filed Oct. 22, 1990, now abandoned which is a divisional application of Ser. No. 07/232,496 filed Aug. 15, 1988 (abandoned).

BACKGROUND OF THE INVENTION

Field of the Invention

The present invention relates to a novel blister-free pressure-sensitive adhesive sheet. More particularly, the present invention relates to a pressure-sensitive adhesive sheet which can be applied and bonded to the surface of shaped articles of various kinds of plastic resins without occurrence of blisters.

Background Information

As is well known, pressure-sensitive adhesive sheets having a coating layer of a pressure-sensitive adhesive are widely used and are now indispensable in a variety of industrial fields, for example, as a printed label, seal on wrapped packages and the like. This is because pressure-sensitive adhesive sheets can be readily bonded to the surface of various substrates conveniently by merely putting on and lightly pressing to the substrate surface and, different from adhesives in general, the pressure-sensitive adhesive forming the coating layer of the sheet contains no organic solvent so that advantageously no problems of environmental pollution are caused thereby.

Pressure-sensitive adhesive sheets can be applied and bonded to the surface of a substrate article of any material almost without limitation including paper, wood, metals, ceramics, plastics and the like. As a consequence of the trend in recent years that light-weight articles are preferred in general, in particular, the quantity of plastic-made products on the way of distribution is rapidly increasing year by year so that the occasion, in which pressure-sensitive adhesive sheets are attached to plastic-made goods or plastic-made packages of goods as a label, is also increasing rapidly. When a transparent pressure-sensitive adhesive sheet used in such an application has a printed pattern as desired, the plastic-made article to which such a sheet is attached on the surface may have an outer appearance as if it were printed directly thereon.

Apart from the application as a label or seal of packages, pressure-sensitive adhesive sheets are sometimes attached to the surface of a board of polycarbonate resins used as a window pane by virtue of the high transparency with an object to protect the surface from scratches or to control transmission of sun light therethrough.

Pressure-sensitive adhesive sheets in general have a serious problem that, when an adhesive sheet is applied and bonded to the surface of an article made of a polystyrene resin, polycarbonate resin and the like, so-called blisters are formed in many instances due to incomplete squeeze-out of the air between the substrate surface and adhesive sheet attached as a label or a protecting sheet. This problem is unavoidable when the face-stock film of the pressure-sensitive adhesive sheet is made of a plastic resin having a gas barrier property such as conventional polyester resins.

When blisters are caused in the pressure-sensitive adhesive sheet attached to the surface of an article as a label, not only the article has a very unsightly appearance which decreases the commercial value but also the label and the like attached to the surface are liable to eventual falling. In a printed label made of a see-through pressure-sensitive adhesive sheet, in particular, it is unavoidable that the appearance is extremely poor because the layer of the adhesive coating exhibits a pockmarked or white and cloudy appearance through the face-stock film. The mechanism of this undesirable phenomenon is that the plastic film as the face-stock film of the pressure-sensitive adhesive sheet acts as a barrier against escape of the gas in a small volume occurring between the face-stock film and adhesive coating layer so that the gas retained there forms a number of gas-filled blisters.

One of the possible means to solve this problem by dissipating the gas in the blisters is to provide a gas-permeable layer made of paper, porous polyurethane and the like between the face-stock film and the adhesive coating layer of the pressure-sensitive adhesive sheet. This method, however, has no general applicability because the overall thickness of the adhesive sheet is necessarily increased so much and the adhesive sheet can no longer be used as a see-through label due to the loss of transparency by the interposed gas-permeable layer.

It is also known that the problem due to the formation of blisters in a pressure-sensitive adhesive sheet can be considerably decreased when a pressure-sensitive adhesive of a certain type is used for the adhesive coating layer. Examples of such a pressure-sensitive adhesive hitherto proposed include those rubber-based ones comprising a block copolymer of styrene-isoprene-styrene type or a block copolymer of styrene-butadiene-styrene type compounded in a specific formulation. Pressure-sensitive adhesive sheets having an adhesive coating layer of such a rubber-based adhesive are, however, not quite satisfactory because of the poor weatherability of the adhesive layer inherent in rubber-based pressure-sensitive adhesives.

SUMMARY OF THE INVENTION

The present invention accordingly has an object to provide an improved blister-free pressure-sensitive adhesive sheet free from the above described problems and disadvantages in the conventional pressure-sensitive adhesive sheets, which has excellent characteristics that the adhesive layer is highly resistant against weathering with excellent retention of adhesiveness and that of blisters can effectively be prevented when the adhesive sheet is applied and bonded to the surface of a substrate even without providing the above mentioned gas-permeable layer between the substrate and the adhesive layer.

Thus, the pressure-sensitive adhesive sheet of the present invention comprises:

(A) a face-stock film; and (B) a coating layer of a pressure-sensitive adhesive composition formed on one surface of the face-stock film, the pressure-sensitive adhesive composition comprising, as the principal ingredient thereof, a copolymer having a weight-average molecular weight in the range from 150,000 to 2,000,000 and a glass transition temperature in the range from $-60°$ C. to $+60°$ C. and composed of (a) from 50 to 85% by weight of a first monomeric moiety of an acrylic ester, (b) from 1 to 30% by weight of a second monomeric moiety of an acrylic compound having a polar group in the molecular structure and (c) from 5 to 40% by weight of a third monomeric moiety of a macromonomer compound having a polymeric molecular chain and a polymerizable functional group at the molecular chain end, the weight ratio of (b) the second monomeric moiety to (c) the third monomeric moiety being in the range from 0.02 to 6.

DETAILED DESCRIPTION OF THE PREFERRED EMBODIMENTS

As is described above, the most characteristic feature of the inventive pressure-sensitive adhesive sheet consists in the very unique pressure-sensitive adhesive composition forming the coating layer on the face-stock film and comprising, as the principal ingredient, a copolymer having a specified molecular weight and a specified glass transition temperature and composed of three types of monomeric moieties each in a specified weight fraction. The invention has been completed as a result of the extensive investigations undertaken with an object to develop a pressure-sensitive adhesive sheet outstandingly free from the disadvantage of blisters leading to a discovery that the polymeric molecular chain of the moiety of the macromonomer introduced into the copolymer as the pendant groups may act to absorb any trace volume of gases emitted from inside of the resinous substrate and responsible for the formation of blisters so that of blisters can be efficiently prevented and the adhesive sheet can exhibit excellent adhesion and retention of adhesiveness to achieve the above described object of the present invention.

The pressure-sensitive adhesive sheet of the present invention basically has a structure in which a coating layer of a pressure-sensitive adhesive composition is provided on the surface of a face-stock film which may be colored or provided with a thin vapor-deposited or sputtered film of a metal, e.g., aluminum, when control of sun light transmission is desired although it is also possible to use a colored pressure-sensitive adhesive. The principal ingredient of the pressure-sensitive adhesive composition is a copolymer composed of (a) a first monomeric moiety of an acrylic ester, (b) a second monomeric moiety of an acrylic compound having a polar group in the molecular structure and (c) a third monomeric moiety of a macromonomer compound having a polymeric molecular chain and a polymerizable functional group at the molecular chain end.

The first monomeric moiety (a) of an acrylic ester is exemplified by the moieties of alkyl esters of acrylic acid or methacrylic acid of which the alkyl group has 1 to 14 carbon atoms. Examples of the acrylic ester monomers from which the first monomeric moiety is derived include esters of acrylic or methacrylic acid with an alcohol having 1 to 14 carbon atoms in a molecule such as methyl alcohol, ethyl alcohol, n-propyl alcohol, isopropyl alcohol, n-butyl alcohol, isobutyl alcohol, n-pentyl alcohol, pentan-2-ol, pentan-3-ol, 2-methyl butan-1-ol, 3-methyl butan-1-ol, hexan-2-ol, 2-methyl pentan-1-ol, 3-methyl pentan-1-ol, 2-ethyl butan-1-ol, 3,5,5-trimethyl hexan-1-ol, heptan-3-ol, 2-ethyl hexan-1-ol, n-decyl alcohol, n-dodecyl alcohol and the like, of which n-butyl acrylate and 2-ethyl hexyl acrylate are preferred. These acrylic ester monomers can be used either singly or as a combination of two kinds or more according to need.

The second monomeric moiety (b) is derived from an acrylic compound having a polar group in the molecular structure. The polar group here implied includes carboxyl group, hydroxy group, amino group, amido group, epoxy group, cyano group, isocyanato group and the like. The acrylic compound may have two kinds or more of these polar groups in a molecule. Examples of the acrylic compound having a polar group include (meth)acrylic acid, 2-hydroxyethyl (meth)acrylate, 2-aminoethyl (meth)acrylate, (meth)acrylamide, glycidyl (meth)acrylate, (meth)acrylonitrile, 2-isocyanoethyl (meth)acrylate, itaconic acid, maleic acid and the like. When these acrylic compounds are polymerized, the polar group or groups should be the pendant groups to the polymeric molecular chain. These acrylic monomers having a polar group or groups can be used either singly or as a combination of two kinds or more according to need.

The third monomeric moiety (c) is derived from a macromonomer and has a polymeric chain and a polymerizable functional group at the molecular chain end. The polymeric chain is composed of the moiety of styrene, methyl methacrylate or a copolymeric moiety of styrene or methyl methacrylate with a minor amount of acrylonitrile or vinyl acetate. The polymeric chain preferably has a molecular weight in the range from 1000 to 30,000 and a glass transition temperature of 30° C. or higher. The polymerizable functional group is not particularly limited insofar as it can be with or incorporated in the above described acrylic ester monomer and the polar acrylic monomer. Examples of suitable copolymerizable functional group include methacryloyl group, allyl group, vinyl benzyl group and the like.

When the macromonomer having a polymeric chain and copolymerizable functional group at the molecular chain end is copolymerized with the above described acrylic ester monomer and the polar acrylic monomer, the copolymer thus obtained is a graft copolymer having the polymeric chains of the macromonomer as the pendant groups to the polymeric main chain. The polymeric chains as the pendant groups of the copolymer serve to prevent occurrence of blisters in the pressure-sensitive adhesive sheet by absorbing any trace volume of gases emitted from the resinous substrate.

The above mentioned macromonomer can be prepared by a variety of known methods without particular limitations. Applicable methods include, firstly, a method in which methacryloyl chloride or the like is reacted with living polymer anions prepared in advance for forming the polymeric chain portion of the macromonomer, secondly, a method in which an oligomer having carboxyl groups at the molecular chain terminals is prepared by the oligomerization of a radical-polymerizable monomer such as methyl methacrylate in the presence of mercapto acetic acid as a chain transfer agent and the oligomer is then converted into a macromonomer by the reaction with glycidyl methacrylate, thirdly, a method in which an oligomer having hydroxy groups at the molecular chain ends is prepared by using 2-mercaptoethyl alcohol as a chain transfer agent and then the oligomer is converted into a macromonomer by the reaction with 2-hydroxyetyl methacrylate, fourthly, a method in which an acrylic monomer is radical-polymerized by using a mercaptan-based chain transfer agent containing a polymerizable functional group, fifthly, a method in which a vinyl monomer is polymerized by ionic polymerization by using vinyl phenyl ketene methyl trimethylsilyl acetal as a polymerization initiator and a fluorine compound as a co-catalyst, and so on without particular limitations.

It is essential in the present invention that the above described copolymer is composed of the three types of the monomeric moieties each in a specific weight fraction such that the weight fractions of the first monomeric moiety (a) of the acrylic ester, the second monomeric moiety (b) of the polar acrylic monomer and the third monomeric moiety (c) of the macromonomer are in the range from 50 to 85% by weight, from 1 to 30% by weight and from 5 to 40% by weight, respectively, with the proviso that the weight ratio of the second monomer moiety (b) to the third monomeric moiety (c) is in the range from 0.02 to 6. When the weight fraction of each of the three monomeric moieties is outside of the above mentioned range, the copolymer is not sufficiently effective to prevent blistering of the pressure-sensitive adhesive sheet or cannot exhibit high adhesive performance.

The copolymer used in the inventive pressure-sensitive adhesive sheet should have a weight-average molecular weight in the range from 150,000 to 2,000,000 or, preferably, from 250,000 to 1,500,000 or, more preferably, from 300,000 to 1,000,000. A weight-average molecular weight of the copolymer smaller than 150,000 is undesirable due to eventual poor holding power of adhesiveness of the copolymer. A weight-average molecular weight larger than 2,000,000, on the other hand, is also undesirable in respect of the poor workability in the coating.

In addition, the copolymer should have a glass transition temperature in the range from $-60°$ C. to $+60°$ C. or, preferably, from $-30°$ C. to $+20°$ C. When the glass transition temperature of the copolymer is lower than $-60°$ C., the pressure-sensitive adhesive sheet hardly has a sufficiently high adhesive bond strength. When the glass transition temperature thereof exceeds $+60°$ C., on the other hand, the ball-tack of the adhesive sheet may be decreased as a trend.

The copolymer used in the inventive pressure-sensitive adhesive sheet can be prepared by any of known methods including the following three methods. Firstly, copolymerization of the three monomers is performed simultaneously by admixing a radical polymerization initiator such as azobisisobutyronitrile with a mixture of an acrylic ester monomer, a polar acrylic monomer and a macromonomer having a polymeric molecular chain and a polymerizable functional group at the molecular chain end to start the copolymerization reaction. Secondly, an acrylic ester monomer and a polar acrylic monomer having a reactive group such as a carboxyl group and hydroxy group are first copolymerized to give a copolymer having reactive groups at the pendant groups followed by the reaction thereof with macrosegments composed of polymeric molecular chain having a reactive group capable of being bonded with the above mentioned reactive groups in the copolymer such as an isocyanate group, hydroxy group, carboxyl group and the like. Thirdly, a monomer having a reactive group capable of initiating a grafting reaction such as a polymerizable organic peroxide, an acrylic ester monomer and a polar acrylic monomer are copolymerized to give a copolymer which is then subjected to a graft-copolymerization reaction with a grafting monomer such as styrene, methyl methacrylate, acrylonitrile and the like.

Although the above mentioned second and the third methods are performed without utilizing the copolymerization reaction of the acrylic ester monomer, polar acrylic monomer and macromonomer, the copolymers obtained by these methods have a final structure identical with that of the copolymer prepared by the first method so that they can be used as the copolymer according to the present invention.

According to the results of the experiments undertaken by the inventors, the desired blister-preventing effect as the object of the present invention cannot be obtained when the above described copolymer is replaced with a copolymer prepared by the copolymerization of an ethylenically unsaturated monomer such as styrene, methyl methacrylate and the like with and other monomers for the nomomeric moieties (a) and (b) having the moiety of styrene of methyl methacrylate as the units forming the main chain of the copolymer or replaced with a polymer blend composed of a polymer such as polystyrene, poly(methyl methacrylate) and the like and a copolymer of an acrylic ester monomer and a polar acrylic monomer.

The above described facts suggest that a mechanism of the blister-preventing effect of the specific copolymer as the pressure-sensitive adhesive as follows. The polymeric molecular chains as the pendant groups form microdomains and the like in the copolymer and this microscopic structure with phase separation is presumably effective for absorption and diffusion of a small volume of gases emitted from the resinous substrate which otherwise may cause the formation of blisters in the adhesive sheet.

The pressure-sensitive adhesive sheet of the present invention can be prepared by coating a surface of a facestock film with the pressure-sensitive adhesive composition mainly composed of the copolymer obtained in the above described manner according to a coating method conventionally used in the manufacture of adhesive sheets. It is optional according to need that the adhesive composition is admixed with aging retarders such as ultraviolet absorbers, antioxidants and the like to enhance the durability of the adhesive sheet.

The type of the base sheet to be coated with the adhesive composition is not particularly limitative including films and sheets of a synthetic resin such as polyester, poly(vinyl chloride), polypropylene, polyethylene, polyurethane and the like, synthetic paper, cellulose-base films and sheets, woven and non-woven cloths as well as knit cloths of various kinds of materials and so on. If desired, these base sheets can be printed to exhibit suitable patterns such as characters and marks on the surface not coated with the pressure-sensitive adhesive to meet the particular application of the adhesive sheet. The coating layer of the pressure-sensitive adhesive on the base sheet should preferably has a thickness in the range from 5 to 100 $\mu m$.

The blister-preventing effect of the inventive pressure-sensitive adhesive sheet can be exhibited most remarkably when the adhesive sheet is applied to the surface of a shaped article of a synthetic resin from which a trace volume of gases usually emitted over a long period of time.

Various kinds of synthetic resins are known as gas-emitting, of which those emitting a relatively large volume of gases responsible for blistering of the adhesive sheets include synthetic resins containing 5% by moles or larger or, in particular, 15% by moles or larger fraction of aromatic units such as styrene-based resins and polycarbonate resins and acrylic resins such as poly(methyl methacrylate) and the like as well as polyolefin-based resins such as polyethylene before lapse of time after molding.

The styrene-based resins above implied include those prepared from a monomer mixture containing 10% by weight or larger or, in particular, 30% by weight or larger amount of styrene monomer such as general-purpose polystyrenes, high-impact polystyrenes, copolymers of acrylonitrile, butadiene and styrene, copolymers of acrylonitrile and styrene, copolymers of methyl methacrylate, butadiene and styrene, copolymers of an acrylic rubber, acrylonitrile and styrene, copolymers of acrylonitrile, an ethylene-propylene rubber and styrene, copolymers of acrylonitrile, a chlorinated polyethylene and styrene, Poly(phenyleneoxide) blended with polystyrene such as Noryl resins and the like. A presumable mechanism for the blistering of a pressure-sensitive adhesive sheet applied to the surface of a shaped article of these styrene-based resins is that the styrene monomer in the form of a gas is emitted from the surface of the molded article.

It is noted that synthetic resins containing an aromatic-ring-containing monomeric moiety in a molar fraction of 5% or larger or, in particular, 15% or larger may sometimes emit gases responsible for the blistering of adhesive sheets even when no monomeric units of styrene are contained therein because such a synthetic resin readily absorbs moisture or readily absorbs low-molecular substances. Synthetic resins having polar groups in the pendant groups to the polymeric chain, such as acrylic resins, also behave in a similar manner.

Polyolefin-based resins such as polyethylene and the like sometimes emit a trace volume of gases before lapse of time after molding although the gas emission therefrom is usually transient and not lasting. The pressure-sensitive adhesive sheet of the present invention is also freed from blistering due to such a transient emission of gases from shaped articles of a polyolefin-based resin.

Among the above mentioned gas-emitting synthetic resins, the blister-preventing effect of the inventive pressure-sensitive adhesive sheet is particularly remarkable when the sheet is applied to the surface of a plate of polycarbonate resin for a window pane, a plate of poly(methyl methacrylate) resin and a shaped article of a styrene-based synthetic resin having high transparency. When a pressure-sensitive adhesive sheet is applied and bonded to the surface of a resin plate of polycarbonate or poly(methyl methacrylate) for window pane use with an object of adjustment of sun light transmission or protection of the surface against scratches, occurrence of blisters in the adhesive sheet is particularly detrimental to the beautiful appearance of the plate. Blistering in a pressure-sensitive adhesive sheet is also very conspicuous when the adhesive sheet is applied as a label to the surface of a shaped article of a styrene-based synthetic resin having high transparency. This problem due to occurrence of blisters is most serious in polystyrene-made cassette cases for magnetic recording tapes. The pressure-sensitive adhesive sheet of the invention can be used particularly advantageously on shaped articles of these synthetic resins.

In the following, examples are given to illustrate the pressure-sensitive adhesive sheet of the invention in more detail but not to limit the scope of the invention in any sense. Following are the procedures for testing of various properties described in the examples.

(1) Viscosity

Viscosity of liquid samples was determined at 23° C. by using a rotational viscometer (Model BM, manufactured by Tokyo Keiki Co.) with a No. 4 rotor rotated at 60 rpm. The values of viscosity are given in centipoise.

(2) Molecular weight

Weight-average molecular weight $\overline{M}w$ was determined by the gel permeation chromatography using a chromatographic apparatus (Model CCP 8000, manufactured by Toso Co.) with tetrahydrofuran as the moving phase taking polystyrenes as the reference samples.

(3) Ball-tack

Ball-tack was determined according to the J. Dow method specified in JIS Z 0237 and the results were recorded by the largest ball stopped.

(4) Adhesive bond strength

According to the method specified in JIS Z 0237, the adhesive sheet was peeled off by pulling at an angle of 180° and the force required for peeling was given in grams per 25 mm width of the sheet.

When the substrate to which the adhesive sheet was bonded was a stainless steel plate, the measurement was undertaken after lapse of 20 minutes from bonding of the adhesive sheet. When the substrate was a polycarbonate plate or a polystyrene plate (thickness 2 mm, manufactured by Nippon Test Panel Co.), the measurement was undertaken after lapse of 24 hours from bonding of the adhesive sheet.

(5) Holding power

Measurement was undertaken according to the method specified in JIS Z 0237 at 40° C. with a load of 1 kg and the results were recorded by the time in seconds taken before falling. The notation of NC indicates no slippage and the notation of cf indicates the cohesive failure.

(6) Blister-preventing effect

When the test was performed on a polystyrene plate, the pressure-sensitive adhesive sheet was applied and bonded to the surface of a transparent polystyrene plate shaped by injection molding (thickness 2 mm, manufactured by Nippon Test Panel Co.) and kept standing for 1 hour at 80° C. in a hot air circulation oven to effect accelerated aging before inspection of the occurrence of blisters.

When the test was performed on a polycarbonate plate, a 0.1% by weight aqueous solution of a surface active agent was sprayed to the surface of a transparent polycarbonate plate (thickness 2 mm, manufactured by Nippon Test Panel Co.) and the pressure-sensitive adhesive sheet was put on the wet surface of the plate. Thereafter, the water between the plate and the sheet was squeezed out to adhesively bond the adhesive sheet to the polycarbonate plate followed by standing for 30 minutes and then by heating for 1 hour in a hot air circulation oven at 80° C. to effect accelerated aging before inspection of occurrence of blisters. The results were recorded in five ratings of A, B, C, D and E according to the following criteria.

A: Absolutely no blister was found.
B: No blistering was found but inspection using a magnifying glass could detect small bubbles, though faintly.
C: Bubbles and blisters were found on some areas.
D: Bubbles and blisters were found all over the surface.
E: The adhesive sheet fell from the surface.

(7) Glass transition temperature

Measurement was performed by the shearing method at 3.5 Hz by using Rheovibron (Model DDV-II-EP manufactured by Orientech Co.).

In the tables, the following abridged notations are used for various monomers and polymers.

2EHA: 2-ethylhexyl acrylate
BA: butyl acrylate

EA: ethyl acrylate
AA: acrylic acid
HEMA: 2-hydroxyethyl methacrylate
AN-6: copolymer of styrene and acrylonitrile end-blocked with methacryloyl groups (Alon Macromonomer AN-6, a product by Toa Gosei Co.)
AA-6: poly(methyl methacrylate) end-blocked with methacryloyl groups (Alon Macromonomer AA-6, a product by Toa Gosei Co.)
C-4500: polystyrene end-blocked with methacryloyl groups (Chemlink C-4500, a product by Sertomer Co.)
ST: styrene
PST: polystyrene resin (Picolastic D-100, a product by Rika Hercules Co.)

EXAMPLE 1

Into a four-necked flask of 500 ml capacity equipped with a reflux condenser, an inlet tube for nitrogen gas, thermometer and stirrer blades were introduced 80 g of 2-ethylhexyl acrylate, 3 g of acrylic acid, 17 g of a copolymer of styrene and acrylonitrile end-blocked with methacryloyl groups (AN-6, supra), 0.53 g of $\alpha,\alpha'$-azobisisobutyronitrile and 230 g of ethyl acetate and, after agitation for 30 minutes at room temperature under a stream of nitrogen, the mixture was heated at 60° C. and agitated for 24 hours to effect the copolymerization reaction.

The thus obtained solution of the copolymer had a viscosity of 3000 centipoise and contained 35% by weight of the copolymer which had a weight-average molecular weight of 680,000.

A pressure-sensitive adhesive sheet was prepared by coating a polyester film having a thickness of 50 $\mu$m with this copolymer solution in a coating amount of 20±2 g/m$^2$ as dried followed by drying in a hot-air circulation oven at 100° C. for 1 minute.

The following tables summarize the formulation of the monomer mixture relative to the kinds of the three monomers and respective amounts thereof in grams, viscosity and solid content of the copolymer solution obtained by the copolymerization reaction, weight-average molecular weight $\overline{M}w$ and glass transition temperature of the copolymer, and the results of the testing obtained with the pressure-sensitive adhesive sheet.

EXAMPLES 2 TO 10 AND COMPARATIVE EXAMPLES 1 TO 5.

The experimental procedure in each of these examples and comparative examples was substantially the same as in Example 1 except that the formulation of the monomer mixture in the copolymerization reaction was as shown in the following tables. Following tables also summarize the characterization of the copolymers thus obtained and the results of testing of the pressure-sensitive adhesive sheets obtained by using the copolymers.

TABLE 1

| | | | Example | | | | | | | |
|---|---|---|---|---|---|---|---|---|---|---|
| | | | 1 | 2 | 3 | 4 | 5 | 6 | 7 | 8 |
| Monomers charged | 1st monomer (g) | | 2EHA (82) | 2EHA (75) | BA (73) | BA (68) | BA (68) | BA (68) | BA (68) | BA (65) |
| | 2nd monomer (g) | | AA (3) | AA (2) | AA (5) | AA (16) | AA (8) | AA (2) | HEMA (8) | AA (12) |
| | 3rd monomer (g) | | AN-6 (17) | C-4500 (23) | C-4500 (22) | AN-6 (16) | AN-6 (24) | AA-6 (30) | AN-6 (24) | AN-6 (23) |
| Copolymer solution | Viscosity, centipoise | | 3000 | 2500 | 2800 | 1400 | 1600 | 5900 | 4400 | 1900 |
| | Solid content, % by weight | | 35 | 40 | 30 | 25 | 30 | 20 | 23 | 23 |
| Copolymer | $M_w' \times 10^{-4}$ | | 68 | 72 | 31 | 79 | 110 | 50 | 71 | 71 |
| | Glass transition temp., °C. | | −42 | −30 | −24 | −18 | −19 | −20 | −21 | −16 |
| Adhesive properties | Ball-tack | | 4 | 4 | 3 | <2 | <2 | <2 | 3 | <2 |
| | Adhesive bond strength, g/25 mm | Stainless steel | 220 | 80 | 1010 | 400 | 820 | 240 | 210 | 310 |
| | | Polycarbonate | 420 | 180 | 510 | 310 | 650 | 390 | 200 | 320 |
| | | Polystyrene | 570 | 310 | 1040 | 300 | 710 | 510 | 210 | 315 |
| | Holding power, seconds | | NC/70,000 | NC/70,000 | NC/70,000 | NC/70,000 | NC/70,000 | NC/70,000 | NC/70,000 | NC/70,000 |
| | Blister prevention | Polycarbonate | B | B | C-B | A | A | A | A | A |
| | | Polystyrene | C-B | B | B | B | C-B | A | C-B | B |

| | | | Example | | Comparative Example | | | | |
|---|---|---|---|---|---|---|---|---|---|
| | | | 9 | 10 | 1 | 2 | 3 | 4 | 5 |
| Monomers charged | 1st monomer (g) | | BA (60) | 2EHA (36) EA (39) | BA (88) | BA (77) | BA (48) | 2EHA (75) | 2EHA (75) |
| | 2nd monomer (g) | | AA (12) | AA (2) | AA (2) | — (—) | AA (16) | AA (2) | AA (2) |
| | 3rd monomer (g) | | AN-6 (28) | C-4500 (23) | AN-6 (10) | AN-6 (23) | AN-6 (36) | ST (23) | PST (23) |
| Copolymer solution | Viscosity, centipoise | | 2600 | 3800 | 2100 | 610 | 1500 | 370 | 100> |
| | Solid content, % by weight | | 23 | 30 | 30 | 30 | 25 | 30 | 40 |
| Copolymer | $M_w' \times 10^{-4}$ | | 76 | 112 | 76 | 31 | 80 | 7 | 12 |
| | Glass transition temp., °C. | | −10 | −17 | −42 | −28 | +5 | −32 | −40 |
| Adhesive properties | Ball-tack | | <2 | <2 | 6 | 2 | <2 | — | — |
| | Adhesive bond strength, g/25 mm | Stainless steel | 220 | 1050 | 800 | 360 | **) | 1300 *) | 260 *) |
| | | Polycarbonate | 250 | 1410 | 1100 | 760 | <10 | 1140 *) | 100 *) |
| | | Polystyrene | 280 | 1720 | 1750 | 1830 | <10 | 1160 *) | 65 *) |
| | Holding power, | | NC/70,000 | NC/70,000 | NC/70,000 | cf/24,700 | **) | cf/1,300 | cf/260 |

TABLE 1-continued

| | | | | | | | | |
|---|---|---|---|---|---|---|---|---|
| seconds | | | | | | | | |
| Blister prevention | Polycarbonate | A | C-B | D | E | A | D | D |
| | Polystyrene | A | A | D | E | A | D | D |

*) Cohesive failure
**) No adhesive bonding

As is clear from the results shown in the tables, the pressure-sensitive adhesive sheet of the present invention is outstandingly free from blistering and exhibits good adhesive bonding strength and holding.

To summarize the advantages obtained by the invention, occurrence of blisters can be effectively prevented in the inventive pressure-sensitive adhesive sheet by forming the adhesive layer with a very unique copolymer even without interposing a gas-permeable layer between the face-stock film and the adhesive layer so that the adhesive sheet is free from undesirable increase in the overall thickness. Moreover, the adhesive layer has good weatherability to retain the adhesiveness over a long period of time without losing the excellent adhesiveness.

By virtue of the above mentioned excellent properties, the pressure-sensitive adhesive sheet of the present invention can be used quite satisfactorily on molded articles of various kinds of synthetic resins or, in particular, of polycarbonate resins and polystyrene resins. When molded articles of synthetic resins are protected by bonding the inventive adhesive sheet, the protection and beautiful appearance of the articles can be maintained over a long period of time because the inventive adhesive sheet is free from occurrence of blisters and the adhesive used therein has good weatherability.

What is claimed is:

1. A composite body which comprises:
   (I) a molded article of a resin; and
   (II) a pressure-sensitive, blister free adhesive sheet bonded to a surface of the molded article by a pressure-sensitive adhesive composition, the pressure-sensitive adhesive sheet comprising
   (A) a face-stock film; and
   (B) a coating layer of the pressure-sensitive adhesive composition formed on one surface of the face-stock film, the pressure-sensitive adhesive composition comprising, as the principal ingredient thereof, a copolymer having a weight-average molecular weight of 150,000 to 2,000,000 and a glass transition temperature of $-30°$ C. to $+20°$ C. and comprising (a) from 50 to 85% by weight of a first monomeric moiety of an acrylic ester, (b) from 1 to 30% by weight of a second monomeric moiety of an acrylic compound having a polar group in the molecular structure thereof and (c) from 5 to 40% by weight of a third monomeric moiety of a macromonomer compound having a polymeric molecular chain of a copolymer of styrene and acrylonitrile and a polymerizable functional group at the molecular chain end, the weight ratio of the second monomeric moiety to the third monomeric moiety being from 0.02 to 6.

2. The composite body as claimed in claim 1, wherein the resin is a polycarbonate resin.

3. The composite body as claimed in claim 1, wherein the resin is a styrene-based resin.

4. The composite body as claimed in claim 1, wherein the resin is an acrylic resin.

5. The composite body as claimed in claim 3, wherein the styrene-based resin is selected from the group consisting of polystyrene; copolymers of acrylonitrile, butadiene and styrene; copolymers of acrylonitrile and styrene; copolymers of methyl methacrylate, butadiene and styrene; copolymers of an acrylic rubber, acrylonitrile and styrene; copolymers of acrylonitrile, an ethylene-propylene rubber and styrene; copolymers of acrylonitrile, a chlorinated polyethylene and styrene; and poly(phenyleneoxide) blended with polystyrene.

6. The composite body as claimed in claim 4, wherein the acrylic resin is poly(methylmethacrylate).

7. The composite body as claimed in claim 1, wherein the acrylic ester forming the first monomeric moiety is an ester of acrylic acid or methacrylic acid with an alcohol having 1 to 14 carbon atoms in a molecule.

8. The composite body as claimed in claim 7, wherein said alcohol is selected from the group consisting of methyl alcohol, ethyl alcohol, n-propyl alcohol, isopropyl alcohol, n-butyl alcohol, isobutyl alcohol, n-pentyl alcohol, pentan-2-ol, pentan-3-ol, 2-methyl butan-1-ol, 3-methyl butan-1-ol, hexan-2-ol, 2-methyl pentan-1-ol, 3-methyl pentan-1-ol, 2-ethyl butan-1-ol, 3,5,5-trimethyl hexan-1-ol, heptan-3-ol, 2-ethyl hexan-1-ol, n-decyl alcohol and n-dodecyl alcohol.

9. The composite body as claimed in claim 1, wherein the acrylic ester forming the first monomeric moiety is n-butyl acrylate or 2-ethylhexyl acrylate.

10. The composite body as claimed in claim 8, wherein the polar group in the acrylic compound forming the second monomeric moiety is selected from the group consisting of a carboxyl group, a hydroxy group, an amino group, an amido group, an epoxy group, a cyano group and an isocyanate group.

11. The composite body as claimed in claim 1, wherein the acrylic compound having a polar group forming the second monomeric moiety is selected from the group consisting of acrylic acid, methacrylic acid, 2-hydroxyethyl acrylate, 2-hydroxyethyl methacrylate, 2-aminoethyl acrylate, 2-aminoethyl methacrylate, acrylamide, methacrylamide, glycidyl acrylate, glycidyl methacrylate, acrylonitrile, methacrylonitrile, 2-isocyanoethyl acrylate, 2-isocyanoethyl methacrylate, itaconic acid and maleic acid.

12. The composite body as claimed in claim 1, wherein the polymeric molecular chain of the macromonomer forming the third monomeric moiety has a molecular weight of 1,000 to 30,000.

13. The composite body as claimed in claim 1, wherein the polymerizable functional group at the molecular chain end of the macromonomer is selected from the group consisting of a methacryloyl group, an allyl group and a vinylbenzyl group.

14. The composite body as claimed in claim 13, wherein the coating layer of the pressure-sensitive adhesive composition has a thickness of 5 to 100 μm.

15. The composite body as claimed in claim 14, wherein the copolymer has a weight-average molecular weight of 250,000 to 1,500,000.

16. The composite body as claimed in claim 1, wherein the acrylic ester forming the first monomeric moiety is selected from the group consisting of 2-ethylhexyl acrylate, n-butyl acrylate and ethyl acrylate; the acrylic acid compound having a polar group forming the second monomeric moiety is selected from the group consisting of acrylic acid and 2-hydroxyethyl methacrylate; and the third monomeric moiety of a macromonomer compound having a polymeric molecular chain and a polymerizable functional group at the molecular chain is a copolymer of styrene and acrylonitrile end-blocked with methacryloyl groups.

17. The composite body as claimed in claim 16, wherein the resin is a polycarbonate resin.

18. The composite body as claimed in claim 16, wherein the resin is a styrene-based resin.

19. The composite body as claimed in claim 16, wherein the resin is an acrylic resin.

20. The composite body as claimed in claim 1, wherein the first monomeric moiety is contained in an amount of 50 to 75% by weight.

21. The composite body as claimed in claim 1, wherein the first monomeric moiety is contained in an amount of 60 to 68% by weight.

* * * * *